(No Model.)
J. V. V. BOORAEM.
APPARATUS FOR WASHING AND SEPARATING SAWDUST AND OTHER MATERIAL BY CENTRIFUGAL ACTION.
No. 353,775. Patented Dec. 7, 1886.
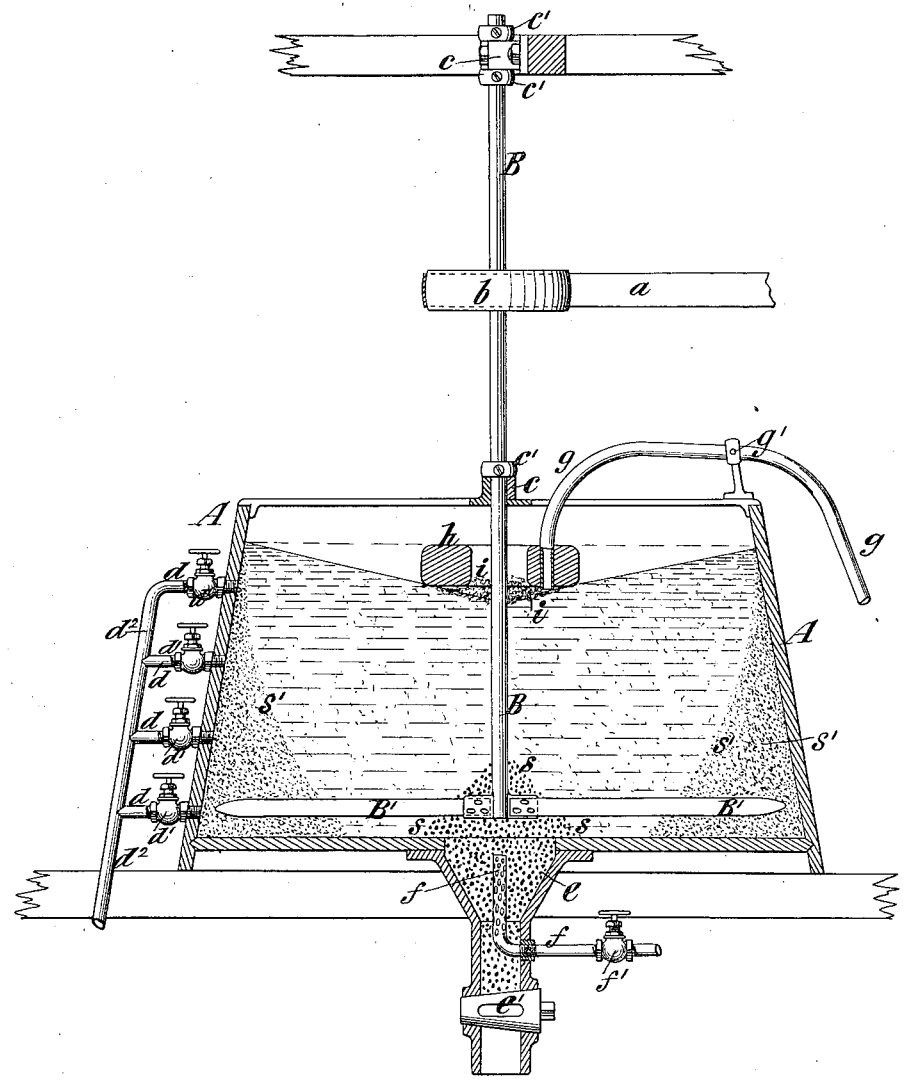
Witnesses:
Emil Herter.
Henry McBride.
Inventor:
John V. V. Booraem
by his Atty
Brown & Hall

UNITED STATES PATENT OFFICE.

JOHN V. V. BOORAEM, OF BROOKLYN, NEW YORK.

APPARATUS FOR WASHING AND SEPARATING SAWDUST AND OTHER MATERIAL BY CENTRIFUGAL ACTION.

SPECIFICATION forming part of Letters Patent No. 353,775, dated December 7, 1886.

Application filed March 4, 1886. Serial No. 194,011. (No model.)

*To all whom it may concern:*

Be it known that I, JOHN V. V. BOORAEM, of the city of Brooklyn, in the county of Kings and State of New York, have invented a new and useful Improvement in Apparatus for Washing and Separating Sawdust and other Material by Centrifugal Action, of which the following is a specification.

Very fine sawdust is now to a considerable extent employed in sugar-refineries as a filtering material or medium. By such use the sawdust becomes mixed with sand, fine particles of cane, and other foreign matters and impurities, and as such sawdust is expensive because of its excessive fineness it is desirable to wash and separate it from the foreign matters and use it repeatedly as a filtering medium.

An important object of my invention is to provide a simple and inexpensive apparatus whereby the sawdust may be washed and freed from particles of foreign matter; but my apparatus may also be advantageously employed in washing other finely-divided substances and removing from such substances heavier or coarser particles of foreign matter.

I have discovered by practical experiment that by rotating small particles of various substances in water the finer particles will be thrown outward and deposit near the circumference of the vat or vessel containing the water, while the heavier and coarser particles will deposit nearer to or at the center of the vat or vessel.

My improved apparatus operates upon this principle; and in what I now consider an approved form it consists of a tank or vat for water wherein is arranged a rotary shaft provided with a stirrer, an outlet for fine material at or near the circumference of the tank or vat, and an outlet at or near the center for the discharge of the coarser or heavier material. I find it desirable to provide outlets for fine material at different points in the height of the tank or vat at its circumference, and these outlets may be severally provided with valves and communicate with a common outlet-pipe. In order to prevent clogging of the outlet for heavier or coarser material, I may employ a jet-pipe arranged therein, and through which water may be discharged thereinto. The sugar often contains clay or other substance which, when the sawdust employed as filtering medium is washed, will produce more or less scum on the water in the tank. To take off such scum, I employ a siphon-tube, which may be flexible or pivoted, and the inner end of which may be attached to a float, so as to hold it always at the surface of the water in the tank or vat.

The accompanying drawing represents a sectional elevation of an apparatus embodying my invention.

A designates a tank or vat, which may be of wood or metal, and in which is a vertical shaft, B; to which rotary motion may be imparted by a belt, $a$, driving onto a pulley, $b$, or by gearing of any other suitable character. This shaft is supported in bearings $c$, and within the tank or vat A is provided with a stirrer, which may consist of arms or blades B'. The shaft B is held against vertical movement by collars $c'$, adjacent to the bearings $c$.

At the circumference of the tank or vat A are represented outlet-pipes $d$, arranged one above another at different points in the height of the tank or vat, and each of which is provided with a valve or gate, $d'$. As here shown, these several outlets $d$ all communicate with a common outlet-pipe, $d^2$.

At or near the center of the tank or vat A, and at the bottom thereof, is an outlet, $e$, controlled by a suitable cock, gate, or valve, $e'$, and which serves to conduct away from the tank or vat the coarser or heavier particles of material. In order to prevent clogging of such coarser or heavier material in the outlet $e$, I may provide a jet-pipe, $f$, leading thereinto and provided with a valve, $f'$. In case of the outlet $e$ becoming clogged, or if it be liable to clog, the valve $f'$ may be opened and jets of water discharged through the pipe $f$, to loosen up the material in the outlet $e$.

To operate the apparatus, the necessary quantity of water and the mixed substances are placed ther in and the rotary shaft and stirrer B B' are operated. The rotary motion thus given the water and the material or substance therein will cause the heavier and coarser particles, $s$, to deposit at or near the center and in and about the discharge-outlet $e$, and will cause the finer particles, $s'$, to tend toward the circumference and bring such finer particles within range of the outlets d. The finer particles may be discharged continuously or periodically through any one or all of the outlet-pipes d, and the coarser material may be discharged through the outlet e.

The apparatus may receive the whole charge of sawdust or mixed material and water at once, and then be operated till the particles of that charge are separated; or the water and mixed material or substance may be introduced continuously, and the finer and the coarser and heavier particles discharged continuously. If desired, the finer particles, s', may be washed over the upper edge of the vat if a high enough level of water be maintained therein.

The filtering medium will sometimes take up from the sugar substances which will produce a scum on the water in the tank or vat, and to get rid of such scum I have represented a siphon pipe or tube, g, pivoted at g', and having its inner end attached to a float, h, which rests on the water and loosely surrounds the shaft B. The float h serves to always hold the inlet end of the tube g at the surface of the water, and thereby causes the scum i to pass off through the tube g.

What I claim as my invention, and desire to secure by Letters Patent, is—

1. In an apparatus for washing and separating, the combination, with a vat for water and the substances to be washed and separated, of a rotary stirrer for producing a rotary motion of the contents, an outlet for finer particles at or near the circumference of the vat, and an outlet for coarser and heavier particles at or near the center thereof, substantially as herein described.

2. The combination, with a vat, of a rotary stirrer for producing a rotary motion of the contents of the vat, outlets for finer particles at or near the circumference of the vat, and at different points in the height thereof, and an outlet for coarser and heavier particles at or near the center of the vat, substantially as herein described.

3. The combination, with a vat, of a rotary stirrer for producing a rotary motion of the contents of the vat, an outlet for finer particles at or near the circumference of vat, an outlet for coarser and heavier particles at or near the center thereof, and a jet pipe in the outlet for coarser and heavier particles, and through which water may be discharged to prevent clogging of said outlet, substantially as herein described.

4. The combination, with a vat and a rotary stirrer for producing the rotary motion of the contents thereof, of an outlet for finer particles at or near the circumference of the vat, an outlet for coarser particles at or near the center of the vat, and a siphon-pipe, the inner end of which is attached to a float for removing scum from the water in the vat, substantially as herein described.

J. V. V. BOORAEM.

Witnesses:
HENRY T. BROWN,
FREDK. HAYNES.